United States Patent
Bauer et al.

[15] 3,676,410
[45] July 11, 1972

[54] ETHYLHEXYL ACRYLATE-ACRYLONITRILE-DIVINYLBENZENE TERPOLYMERS

[72] Inventors: Richard G. Bauer; George P. Patitsas, both of Kent, Ohio

[73] Assignee: The Goodyear Tire & Rubber Company, Akron, Ohio

[22] Filed: Aug. 24, 1970

[21] Appl. No.: 66,650

[52] U.S. Cl. ............260/80.81, 260/2.8 N, 260/45.85, 260/85.5 ES, 117/124 E, 117/126 R, 117/132 B, 117/148
[51] Int. Cl. ................................................C08f 15/40
[58] Field of Search....................260/80.81, 85.5 ES

[56] References Cited

UNITED STATES PATENTS

| 2,759,900 | 8/1956 | Caldwell et al. | 260/17 |
| 2,885,371 | 5/1959 | Tauani et al. | 260/2.2 |
| 3,316,123 | 4/1967 | Savina et al. | 117/155 |

Primary Examiner—Joseph L. Schofer
Assistant Examiner—Stanford M. Levin
Attorney—F. W. Brunner and V. G. Parker

[57] ABSTRACT

A chlorine-free acrylic ester/vinyl nitrile unvulcanizable copolymer and a cross-linked acrylic ester/vinyl nitrile chlorine-free copolymer exhibit a combination of clarity, good temperature flexibility and high temperature strength. The copolymer has good sprayability when diluted with 70 to 90 weight percent of certain non-aqueous solvents. The cross-linked clear interpolymer is a thermoplastic which can be fabricated into a variety of useful products.

3 Claims, No Drawings

ETHYLHEXYL ACRYLATE-ACRYLONITRILE-DIVINYLBENZENE TERPOLYMERS

This invention relates to transparent acrylate and methacrylate/vinyl nitrile copolymers which have been optionally cross-linked and to sprayable solutions of the copolymer.

In the practice of the present invention, monomeric mixtures containing one or more monomers from each of the two essential classes disclosed, are prepared and subjected to polymerization. While the proportions of each of the two essential monomers in the monomeric mixture may vary somewhat, such variation must be within certain definite limits in order to produce clear, rubbery interpolymers having the improved properties which are the objects of this invention, yet retaining the desirable properties possessed by the polymeric alkyl acrylates. For example, the mixture advantageously contains from 30 to 90 percent by weight of one or more alkyl acrylates or mixtures of acrylates and methacrylates and from 10 to 70 percent by weight of one or more of the vinyl nitrile monomers. It is preferred that the mixture contain from 40 to 80 percent of alkyl acrylate and 20 to 60 percent of a vinyl nitrile monomer such as acrylonitrile, methacrylonitrile and ethacrylonitrile.

When the acrylate/vinyl nitrile copolymers are cross-linked, it is preferred that about 0.1 to 5.0 weight percent of the cross-linking agent such as divinyl benzene be used.

The polymerization of the above monomer mixtures may be effected by a number of known methods. For example, polymerization of the alkyl acrylate or an admixture thereof with a minor proportion of alkyl methacrylate may be effected in solution or in a homogeneous system by the application of heat or actinic light with or without the presence of peroxygen compounds known to initiate polymerization. It is preferred, however, to carry out polymerization of the monomeric mixture in non-aqueous solution in the presence of a polymerization initiator and, if desired, a polymerization modifier. The ratio of alkyl acrylate to alkyl methacrylate may vary from 95/5 to 40/60, a major proportion of the acrylate being preferred.

Polymerization initiators include benzoyl peroxide, hydrogen peroxide, cumene hydroperoxide, and other peroxygen compounds as well as other types of polymerization initiators such as diazoamino benzene. Those soluble in hydrocarbons are, of course, preferred in the solution or homogeneous methods in accordance with the invention. Other substances which speed up the reaction such as a reducing agent in combination with one of the peroxygen compounds may be utilized. Polymerization modifiers such as the sulfur-containing modifiers including aliphatic mercaptans usually employed in the polymerization of butadiene hydrocarbons to form rubbery polymers, have much the same effect on the polymerization of the alkyl acrylates and may be advantageously employed when a very soft polymer is desired.

If the polymerization is conducted in emulsion, a water soluble catalyst is employed. Such catalysts include potassium persulfate, ammonium persulfate and other recognized water soluble catalysts. Also if emulsion polymerization is used, the amount of the modifier such as an aliphatic mercaptan may be increased to 0.5 to 1.0 part per 100 parts by weight of polymer.

In the polymerization of the monomeric mixtures of this invention, temperature is not critical, permissible reaction temperatures varying from as high as 100° C. or even higher down to 0° C. or even as low as −10° or −20° C. though the temperature preferably used is in the range of 20° to 80° C. In solution polymerization with temperatures of 20° to 80° C., it is possible to obtain quantitative yields of copolymer in from about 1 to about 15 hours.

Clear copolymers are made in a conventional manner as described above and also, for example, in Chemical Reviews 46, 191 (1950); Journal of Polymer Science 26, 9-22 (1957); Journal of Applied Polymer Science 5, 337-348 (1961); U.S. Pat. Nos. 2,851,446; 2,851,447; 2,851,448; 2,984,650 and 2,984,651; and British Plastics, pgs. 525–552 (December, 1958).

Typical alkyl acrylates and alkyl methacrylates useful for the purposes of the present invention include, among others, the following: ethyl acrylate, n-propyl acrylate, n-butyl acrylate, isobutyl acrylate, n-octyl acrylate, 2-ethyl hexylacrylate, methyl methacrylate, butyl methacrylate, n-hexyl methacrylate, tetradecyl methacrylate, n-decyl methacrylate, and 2-ethyl hexyl methacrylate.

Typical initiators suitable for use in the present invention include, among others, t-butyl peroxypivalate, benzoyl peroxide, lauroyl peroxide, isopropyl percarbonate, t-butyl peroxyisobutyrate, 2,4-dichlorobenzoyl peroxide, and azobisisobutyronitrile.

Suitable solvents, which should comprise from 40 to 90 percent by weight of the reaction mixture, include, among others, such ethers as tetrahydrofuran and/or dioxane and/or such ketones as acetone; methyl ethyl ketone; methyl isobutyl ketone; ethyl amyl ketone; cyclohexanone; mixtures thereof, etc.

In order to more fully illustrate the present invention, the following experimental data are given:

EXAMPLE 1

A transparent copolymer was prepared by a solution polymerization technique in which 100 parts by weight of tetrahydrofuran, 60 parts of 2-ethyl hexyl acrylate and 40 parts of acrylonitrile were charged to an evacuated reactor and then the charged reactor was flushed twice with nitrogen. The initiator, t-butyl peroxypivalate, was added from a pressurized cylinder bomb under nitrogen. Special care was exercised to prevent the ingress of air. The batch was heated to 140° F. (60° C.) and stirred at 250 rpm using a turbine or marine agitator, with and/or without baffles. 25 pounds per square inch of nitrogen pressure was maintained in the reactor. The reaction was conducted until approximately 50 percent solids content was obtained. The batch was then cooled to room temperature and the following materials were added: 0.1 part by weight of Wingstay V (sterically hindered phenolic antioxidant), 0.1 part by weight of dilaurylthiodiproprionate, and 1.0 part by weight of Cyasorb-UV531 (2-hydroxy-4-n-octoxy benzophenone).

If the total run fails to reach 50 weight percent solids (±one weight percent) an additional 0.5 part by weight of t-butyl peroxypivalate is added.

EXAMPLE 2

A transparent copolymer was prepared by a solution polymerization technique in which 100 parts by weight of methyl ethyl ketone (2-butanone), 60 parts of 2-ethyl hexyl acrylate and 40 parts of acrylonitrile were charged to an evacuated reactor and then the charged reactor was flushed twice with nitrogen. The initiator, t-butyl peroxypivalate, was added from a pressurized cylinder bomb under nitrogen. Special care was exercised to prevent the ingress of air. The batch was heated to 140° F. (60° C.) and stirred at 250 rpm using a turbine or marine agitator, with and/or without baffles. 25 pounds per square inch of nitrogen pressure was maintained in the reactor. The reaction was conducted until approximately 50 percent solids content was obtained. The batch was then cooled to room temperature and the following materials were added: 0.1 part by weight of Wingstay V (sterically hindered phenolic antioxidant), 0.1 part by weight of dilaurylthiodipropionate, and 1.0 part by weight of Cyasorb-UV531 (2-hydroxy-4-n-octoxy benzophenone).

If the run fails to reach approximately 50 weight percent solids an additional 0.5 part by weight of t-butyl peroxypivalate is added.

EXAMPLES 3 to 7

The product of Example 1 was diluted in accordance with the invention for purposes of spraying, painting or dipping from 10 to 30 percent (e.g. 20 percent) solids by addition of the following solvent systems: methyl isobutyl ketone; methyl ethyl ketone; acetone; or an admixture of 50 parts by weight of methyl ethyl ketone, 43 parts by weight of toluene, and 7 parts by weight of isopropyl alcohol.

It was noted that the last mentioned solvent system and/or methyl isobutyl ketone were the most satisfactory for spraying. Commonly used solvents such as mineral spirits, isobutyl alcohol or toluene were not satisfactory when used alone.

The coatings of Examples 3 to 7 adhered to marble, glass, wood, and steel. The coating, applied to smooth marble, withstood over 5,000 hours in a Carbon-Arc Fadeometer without discoloration or embrittlement.

EXAMPLE 8

A polymer was prepared by an emulsion polymerization technique in which formulation 1, consisting of 186 parts by weight of deionized water, 7.4 parts by weight (28 percent active surfactant) sodium tetradecyl sulfate, and 0.1 part by weight of $K_2S_2O_8$ (potassium persulfate), was charged to an evacuated reactor and then the charged reactor was flushed twice with nitrogen. Formulation 2 was then prepared consisting of 40 parts by weight of acrylonitrile, 60 parts by weight of 2-ethylhexyl acrylate, 1.0 part by weight (55 percent active) of divinyl benzene, and 0.15 part by weight of mixed tertiary mercaptans. Formulation 2 was then charged to the reactor and the batch heated to 140° F. (60° C.) and stirred at 250 revolutions per minute using a turbine agitator with baffles. 25 pounds per square inch of nitrogen pressure was maintained in the reactor. The reaction was conducted until 34.5 percent solids content was obtained. The batch was then cooled to room temperature and the following emulsified dispersions were added: 0.1 part by weight of Wingstay V (sterically hindered phenolic antioxidant), 0.1 part by weight of dilaurylthiodipropionate, 0.5 part of Weston 440 (proprietary phosphite), and 1.0 part by weight of Cyasorb UV-531 (2-hydroxy-4-n-octoxy benzophenone) in water. The latex was coagulated in a hot aqueous 3.0 weight percent magnesium sulfate solution and washed thoroughly with deionized water. The coagulated crumb was dried in an oven at 50° C. (122° F.).

If after formulation 2 is added to the reactor, and maintained under 25 psi nitrogen in the reactor, the batch fails to initiate within 1 hour, the following solution is added: 0.03 part by weight of sodium bisulfite dissolved in 1.0 part by weight of deionized water. If the total run fails to reach 34.5 weight percent solids the following is added: 0.03 part by weight of sodium bisulfite in 1.0 part by weight of deionized water, and 0.03 part by weight of potassium persulfate in 1.0 part by weight of deionized water.

Some physical properties of the resulting polymer at 77° F. are as follows: tensile strength, 3,000 psi; ultimate elongation, 350 percent; crescent tear strength, 400 lbs/in.; and Elmendorf tear strength, 250 gms/mil. The resulting polymer also showed a Masland cold crack temperature of −55° F. for a 2 mil film and +5° F. for a 15 mil sheet.

The general range of physical properties for the polymers of the invention are as follows: the range for tensile strength at 77° F. is 1,000 to 5,000 psi; at −20° F. is 5,000 to 10,000 psi; at 120° F. is 600 to 2,500 psi; and at 150° F. is 100 to 500 psi.

The range for ultimate elongation at 77° F. is from 200 to 450 percent; at −20° F. from 2 to 50 percent; at 120° F. from 300 to 600 percent; and at 150° F. from 500 to 700 percent.

The range for crescent tear strength at 77° F. is from 150 to 600 pounds/inch; for Elmendorf tear strength at 77° F. is from 20 to 500 grams/mil; and the Masland cold crack temperature range for a 2 mil film is from −40° to −70° F.; and for a 15 mil sheet is from −10° to +20° F.

The weathering properties of the polymer were determined by exposing a sample for 5,000 hours in a Xenon-Arc weatherometer. Retention of physical properties was excellent and the polymer retained its water-white color.

On outdoor exposure of films and thin sheets in Florida and Arizona for 2 years, there was no discoloration and loss of physical properties was minimal.

For the purposes of the present invention, the vinyl nitrile monomers used in the examples may comprise one or more of the following: acrylonitrile, methacrylonitrile, ethacrylonitrile, and mixtures thereof.

While certain representative embodiments and details have been shown for the purpose of illustrating the invention, it will be apparent to those skilled in this art that various changes and modifications may be made therein without departing from the spirit or scope of the invention.

What is claimed is:

1. A transparent terpolymer composition having a tensile strength at 77° F. of from 1,000 to 5,000 psi, an ultimate elongation at 77° F. of from 200 to 450 percent, a crescent tear strength at 77° F. of from 150 to 600 psi, an Elmendorf tear strength at 77° F. of from 20 to 500 grams/mil, a Masland cold crack temperature of from −40° F. to −70°F. when measured on a 2 mil film of the polymer, the terpolymer consisting essentially of from 40 percent to 80 percent of 2-ethylhexyl acrylate, 20 percent to 60 percent of acrylonitrile, and from about .1 percent to about 5.0 percent of divinyl benzene, the percentages being by weight.

2. A film of the composition of claim 1.

3. A solvent solution of the composition of claim 1.

* * * * *